(12) United States Patent
Fiorese et al.

(10) Patent No.: US 10,508,664 B2
(45) Date of Patent: Dec. 17, 2019

(54) GAS CYLINDER ACTUATOR WITH OVERTRAVEL SAFETY DEVICE

(71) Applicant: SPECIAL SPRINGS S.R.L., Romano D'Ezzelino (IT)

(72) Inventors: Massimo Fiorese, Bassano Del Grappa (IT); Daniel Fantinato, Bassano Del Grappa (IT); Roberto Rech, Nove (IT)

(73) Assignee: SPECIAL SPRINGS S.R.L., Romano D'Ezzelino (IT)

( * ) Notice: Subject to any disclaimer, the term of this patent is extended or adjusted under 35 U.S.C. 154(b) by 131 days.

(21) Appl. No.: 15/381,780

(22) Filed: Dec. 16, 2016

(65) Prior Publication Data
US 2017/0175784 A1 Jun. 22, 2017

(30) Foreign Application Priority Data
Dec. 21, 2015 (IT) .................. 102015000085553

(51) Int. Cl.
*F15B 15/14* (2006.01)
*F16F 9/02* (2006.01)

(52) U.S. Cl.
CPC ........ *F15B 15/1428* (2013.01); *F16F 9/0218* (2013.01); *F16F 2230/24* (2013.01)

(58) Field of Classification Search
CPC ...... F16F 7/12; F16F 7/003; F16F 9/06; F16F 9/02; F16F 9/3242
USPC ........................................ 92/161; 91/185 R
See application file for complete search history.

(56) References Cited

U.S. PATENT DOCUMENTS

| 5,680,808 | A | 10/1997 | Day et al. |
| 2003/0110942 | A1 | 6/2003 | Wirth et al. |
| 2006/0231991 | A1* | 10/2006 | Chun .................... F16F 9/0218 267/119 |

(Continued)

FOREIGN PATENT DOCUMENTS

| CN | 102405360 A | 4/2012 |
| CN | 103291684 A | 9/2013 |
| EP | 1366308 A1 | 12/2003 |

(Continued)

OTHER PUBLICATIONS

Chinese Office Action dated Jul. 29, 2019 received in Chinese Application No. 201611190687.5.

*Primary Examiner* — Michael Leslie
*Assistant Examiner* — Daniel S Collins
(74) *Attorney, Agent, or Firm* — Scully, Scott, Murphy & Presser, P.C.

(57) ABSTRACT

A gas cylinder actuator with overtravel safety device, comprising:
  a tubular containment jacket,
  two opposite heads for closing the tubular jacket, with corresponding sealing elements between the heads and the jacket, one head of which being provided with a through passage hole for a stem-piston,
  a stem-piston,
  between the tubular jacket, the heads and the stem-piston there being a chamber for pressurized gas, the gas cylinder actuator being characterized in that the tubular jacket has, at at least one of the portions affected by a head, a lightened portion that is preset to be deformed in case of compression in an axial direction, allowing the relative axial movement of the corresponding head toward the inside of the tubular jacket so as to form a (Continued)

gas discharge passage between the jacket, the head and the corresponding sealing element.

11 Claims, 6 Drawing Sheets

(56) References Cited

U.S. PATENT DOCUMENTS

2013/0228069 A1* 9/2013 Cappeller ............... F16J 10/00
92/169.1

FOREIGN PATENT DOCUMENTS

| EP | 2634451 A1 | 9/2013 |
| EP | 2933524 A1 | 10/2015 |
| FR | 2833326 A1 | 6/2003 |

* cited by examiner

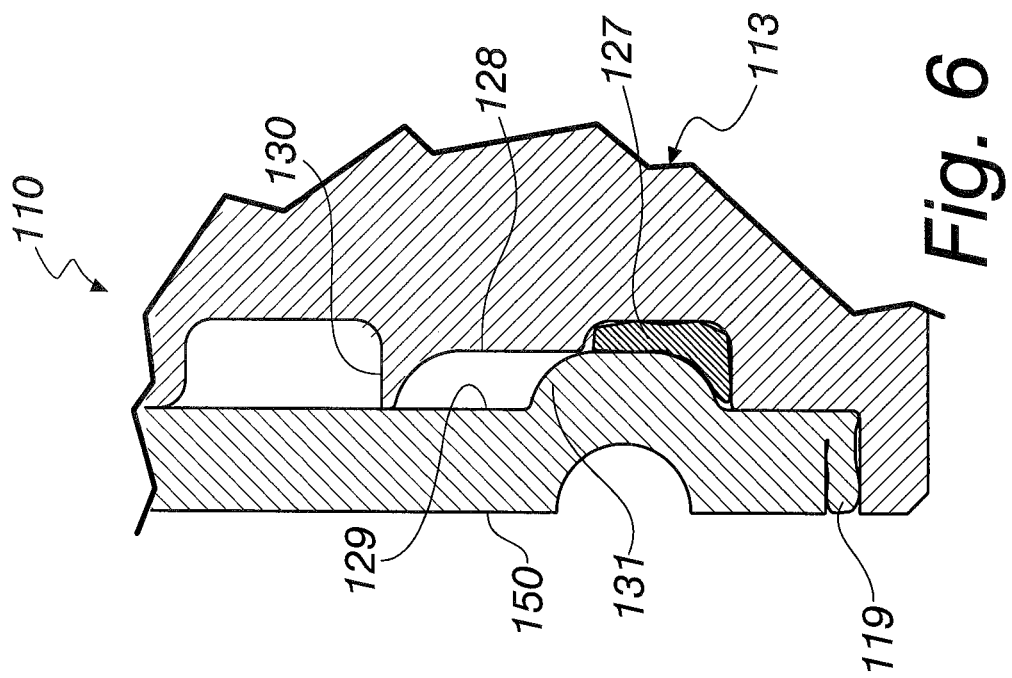
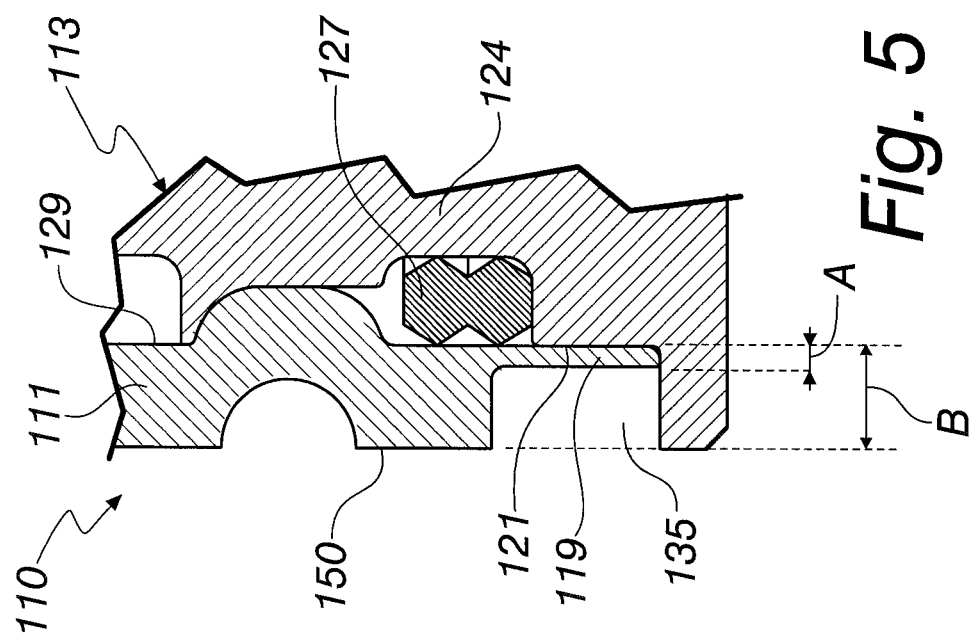

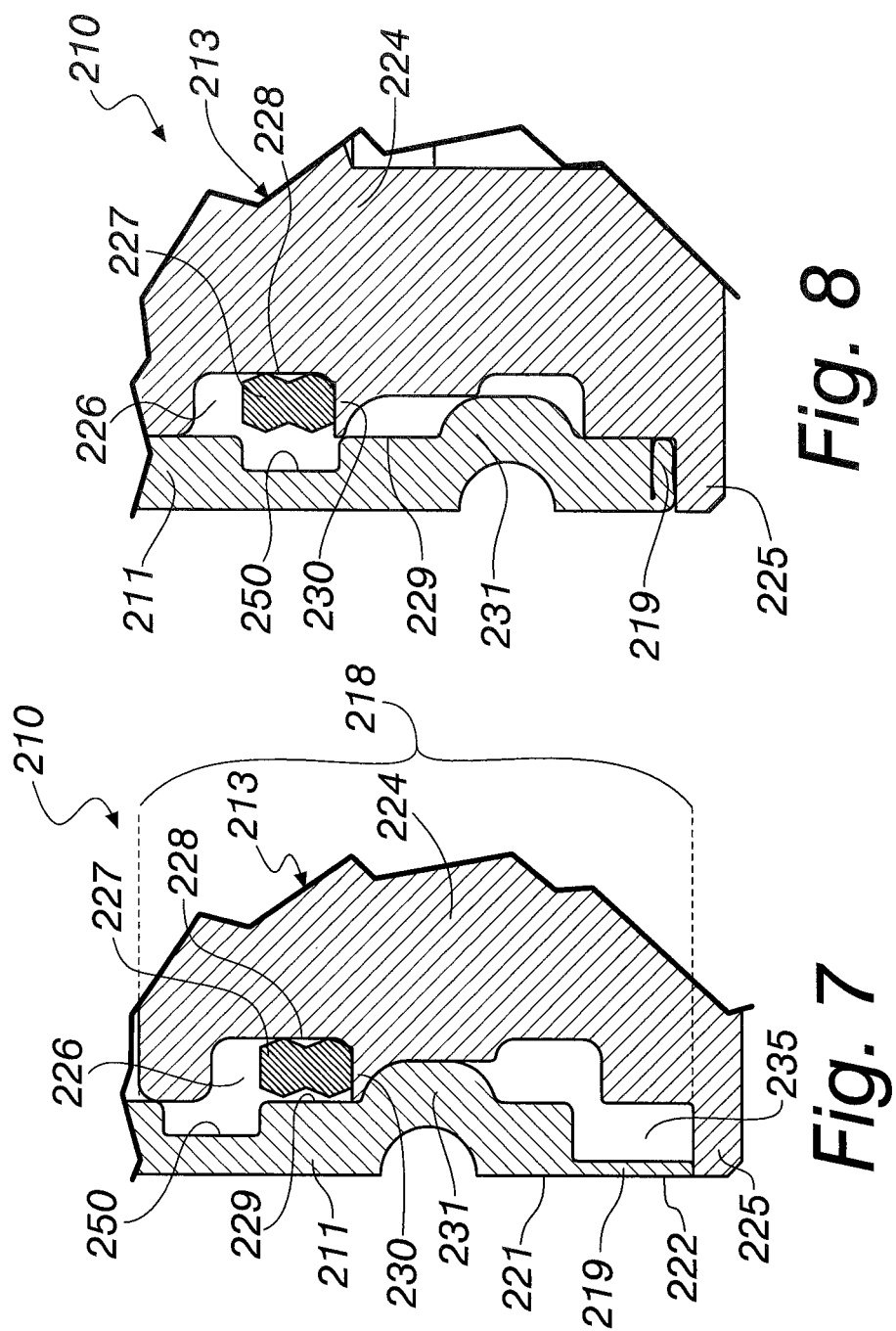

GAS CYLINDER ACTUATOR WITH OVERTRAVEL SAFETY DEVICE

The present invention relates to a gas cylinder actuator with overtravel safety device.

Gas cylinder actuators are generally formed by a tubular gas containment jacket, which is closed hermetically at one end by a bottom provided with a gas loading valve and at the opposite end by a head portion, which is perforated for the passage of a stem with a piston, which translates inside said jacket; the jacket, the bottom and the head portion form the stroke compartment for the piston, while said piston, together with the jacket and the bottom, forms the gas compression and expansion chamber.

These gas cylinder actuators are used typically but not exclusively also in situations, such as molds, molding presses and the like, in which they can be subjected to situations of high internal pressure or impact with the associated parts of a press or of a mold, such that they can be damaged; this damage can render the gas cylinder actuator unusable, forcing replacement and interruption of the machine or apparatus in which it is arranged to work, but can also be such as to harm an operator who is in the vicinity, as in the case of explosion due to uncontrolled pressure increase, or in the case of explosion due to damage to the stem-piston or of the parts that retain it inside the jacket, or rupture with uncontrolled escape of pressurized gas.

One of the reasons that mainly lead to this damage is the so-called overtravel of the piston, i.e., a retracting stroke of the stem with piston that is greater than allowed from the construction standpoint for that particular gas cylinder actuator, with impact of the slider of the press against the body of said gas cylinder actuator, indeed generating a so-called overtravel that can be unsustainable for the structure of the actuator as a whole.

The actuator, therefore, can be deformed or can break in the joining points between the parts that compose it or the sealing elements thereof can yield, and in all these cases an unexpected, unwanted and dangerous rapid escape of gas can be caused.

In order to prevent the occurrence of these dangerous overtravel situations, gas cylinder actuators have been devised which comprise safety systems designed for the controlled and safe outflow of the pressurized gas in case of overtravel.

One of these overtravel safety systems is disclosed in EP1366308B1; this patent describes a gas cylinder actuator, comprising a tubular enclosure, a stem-piston and a perforated head for the passage of the stem of the stem-piston, the enclosure of which has a fracture or distortion impression designed to facilitate the controlled deformation of the enclosure in case of excessive stress due to overtravel, with deformation of the tubular body in the direction of an outward bending, with reduction or complete elimination of the contact between an annular sealing element of the perforated head portion, which acts as a guide for the piston-cylinder, and the cylindrical body itself; the gas in overpressure can exit by means of the seal that is no longer provided.

This safety system has an important limitation, which is linked to the fact that if the tubular enclosure comprises a cylindrical body and a head for closing the cylindrical body which are provided monolithically, the safety deformation that occurs in case of an overtravel situation causes the replacement of the entire actuator, which in practice can no longer be restored for reuse, including the closure head, which lies opposite the passage head for the stem-piston, which is often a portion that is onerous to provide due to the numerous machining operations that involve it, for example for drilling to provide a gas loading passage and the valve seat or the closure plug of said passage.

Moreover, in general, a deformation or rupture in a substantially radial direction directed outward is always a dangerous situation for any elements or people in the vicinity, in particular in the case of containers with pressurized fluid such as a gas cylinder actuator.

The aim of the present invention is to provide a gas cylinder actuator with overtravel safety device capable of obviating the limitations of gas cylinder actuators of the known type.

Within this aim, an object of the invention is to provide a gas cylinder actuator that is safer than gas cylinder actuators with overtravel safety device of the known type.

Another object of the invention is to provide a gas cylinder actuator in which occurrence of the operation of the overtravel safety device is clearly detectable.

Another object of the invention is to provide a gas cylinder actuator with a functionality that is not lower than that of gas cylinder actuators of the known type.

This aim, these objects and others which will become better apparent hereinafter are achieved by a gas cylinder actuator with overtravel safety device, comprising:

a tubular containment jacket, two opposite heads for closing said tubular jacket, with corresponding sealing elements between the heads and the jacket, one of the heads being provided with a through passage hole for a stem-piston, a stem-piston, between said tubular jacket, said opposite heads and said stem-piston there being a chamber for pressurized gas, said gas cylinder actuator being characterized in that said tubular jacket has, at at least one of the portions affected by one of said opposite heads, a lightened portion that is preset to be deformed in case of compression in an axial direction, allowing the relative axial movement of a corresponding head of said opposite heads toward the inside of said tubular jacket so as to form a gas discharge passage between the jacket, the corresponding head and the corresponding sealing element.

Further characteristics and advantages of the invention will become better apparent from the description of five preferred but not exclusive embodiments of the gas cylinder actuator according to the invention, illustrated by way of non-limiting example in the accompanying drawings, wherein:

FIG. 5 is a view of a detail of the gas cylinder actuator according to the invention in a second embodiment, in a configuration for normal operation;

FIG. 6 is a view of the same detail of FIG. 5 in a configuration in which overtravel has occurred;

FIG. 7 is a view of a detail of the gas cylinder actuator according to the invention in a third embodiment, in a configuration for normal operation;

FIG. 8 is a view of the same detail of FIG. 7 in a configuration in which overtravel has occurred;

Figure 1:
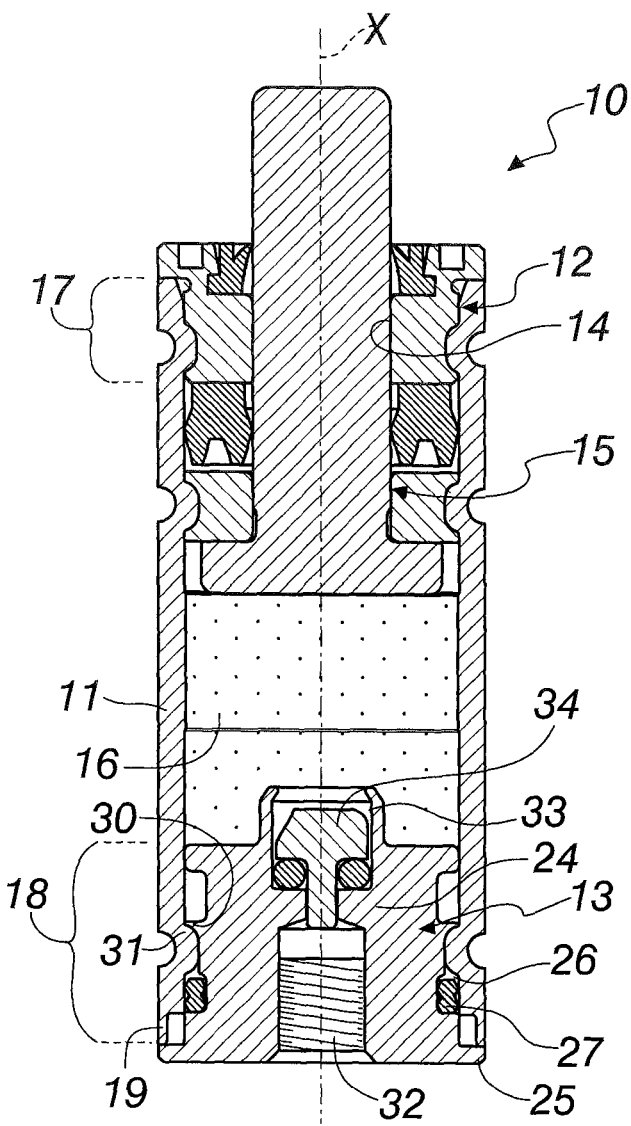
FIG. 1 is a sectional side view of a gas cylinder actuator according to the invention in a first embodiment thereof.
Figure 2:
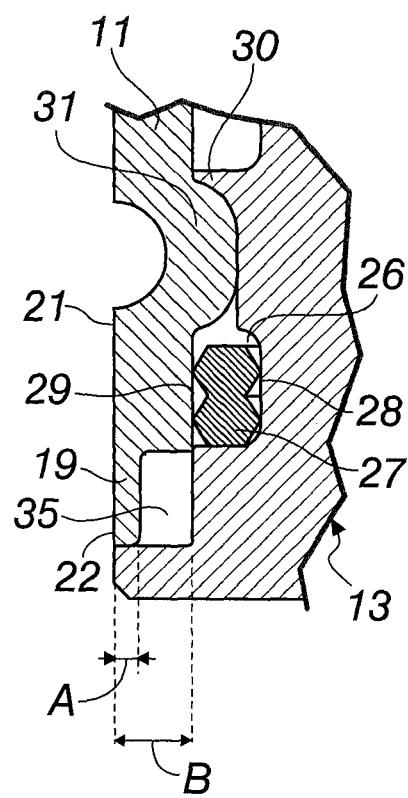
FIG. 2 is a view of a detail of the gas cylinder actuator of FIG. 1 in a configuration for normal operation.

With reference to the figures, a gas cylinder actuator according to the invention is generally designated by the reference numeral 10 in a first embodiment thereof.

The gas cylinder actuator 10, with overtravel safety device, comprises:

a tubular containment jacket 11, two opposite heads 12, 13 for closing the tabular jacket 11, with corresponding sealing elements between the heads and the jacket described in greater detail hereinafter, one head of which, for example a first head 12, is provided with a through passage hole 14 for a stem-piston 15, a stem-piston 15.

Between the tubular jacket 11, the heads 12 and 13 and the stem-piston 15 there is a chamber for pressurized gas 16.

The particularity of the gas cylinder actuator 10 resides in that the tubular jacket 11 has, at one of the portions 17 and 18 affected by a head 12 and 13, a lightened portion 19 that is preset to be deformed in case of compression in an axial direction.

In this first embodiment, the portion of tubular jacket 11 that is affected by a head is constituted by the portion 18 of the tubular jacket 11, affected by the second head 13, the lightened portion 19 being formed at the end of the tubular body 11 that rests against a corresponding wider perimetric edge 25 of the second head 13.

The lightened portion 19, in case of compression in an axial direction of the tubular jacket 11, is deformed inward, allowing the relative movement of the corresponding head 13 in an axial direction, i.e., in the direction of the main axis of symmetry X of the gas cylinder actuator 10, toward the inside of the tubular jacket 11, so as to form a gas discharge passage 20 between the jacket 11, the head 13 and the corresponding sealing element, described hereinafter.

Figures 3, 4:
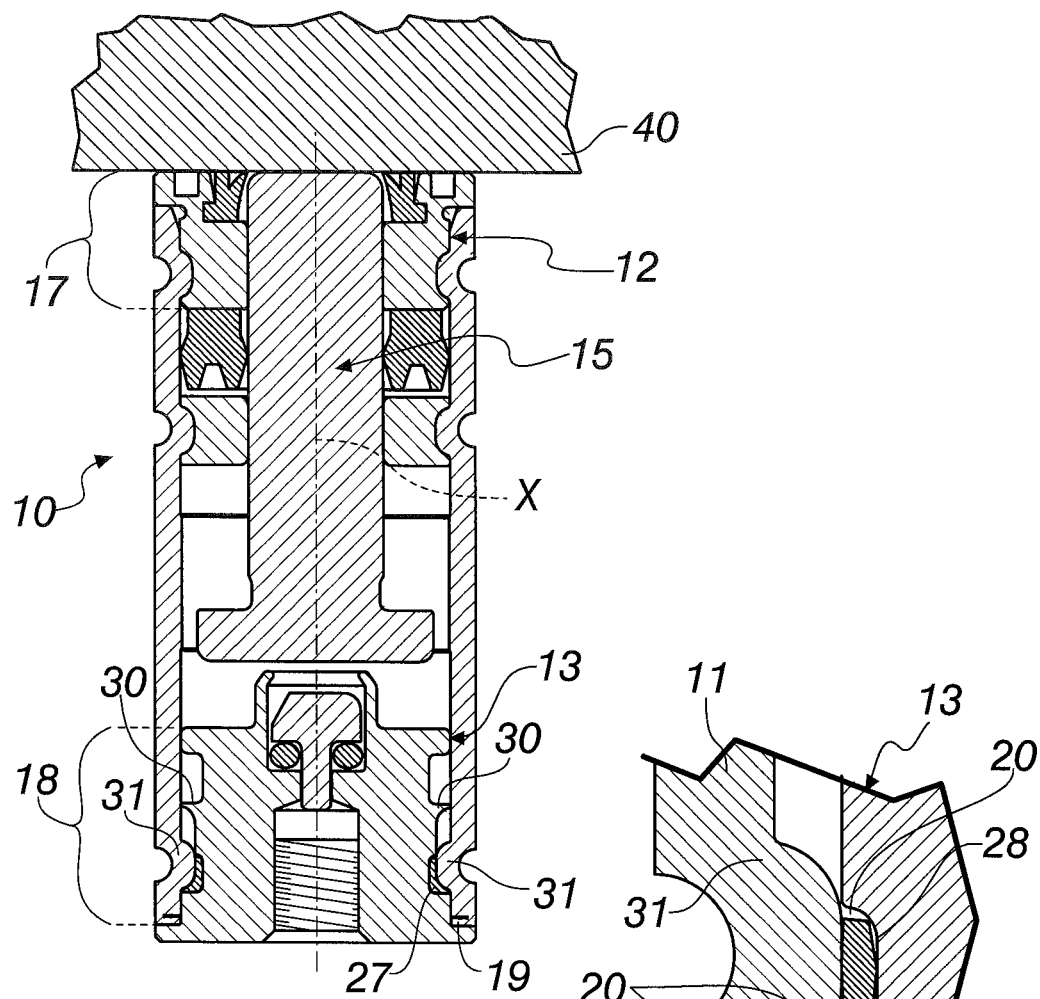
FIG. 3 is a view of a portion of the gas cylinder actuator of FIG. 1 in a configuration in which overtravel has occurred.
FIG. 4 is a view of a detail of FIG. 3.

The discharge passage 20 is highlighted in FIG. 4.

In this first embodiment of the invention, the lightened portion 19 is constituted by a perimetric annular flap that is formed at the end of the tubular jacket 11 and extends from it in the axial direction X; said annular flap has a cross-section, in the radial direction A, that is smaller than the corresponding cross-section in the radial direction B of the central body of the tubular jacket 11.

In this first embodiment, the annular flap that forms the lightened portion 19 is located at the outer surface 21 of the tubular jacket 11 and therefore the outer surface 22 of the lightened portion is extended continuously from the outer surface 21 of the body of the cylindrical jacket 11.

The second head 13, for closing the tubular jacket 11 at the opposite end with respect to the first head 12, is constituted by a body with cylindrical symmetry 24, shaped so as to arrange itself in the corresponding end portion 18 of the tubular jacket 11, which has a wider perimetric edge 25, for resting in an axial direction X for the lightened portion 19, i.e., the annular flap, an annular slot 26 for a sealing element, for example a static sealing ring 27, which is designed to operate between the outer surface 28 of the head 13 and the internal surface 29 of the tubular jacket 11;

an extraction-preventing shoulder 30 adapted to abut against the corresponding internal annular protrusion 31 that protrudes radially from the internal surface 29 of the tubular jacket 11, the extraction-preventing shoulder 30 and the internal annular protrusion 31 being adapted to cooperate to prevent the extraction of the head 13 from the tubular jacket 11;

a gas loading hole 32;

a seat 33 for a check valve 34.

The internal annular protrusion 31 is contoured and sized so as to be preset for compression or displacement of said sealing element, i.e., of the static sealing ring 27.

Between the lightened portion 19 and the corresponding head 13 there is an annular cavity 35 in which the annular flap that forms the lightened portion 19 folds when an overtravel situation occurs.

The annular flap that forms the lightened portion 19 is then moved to bend toward the inside of the gas cylinder actuator 10, i.e., toward the head 13, allowing the axial displacement of the tubular jacket 11.

The operation of the gas cylinder actuator 10 is exemplified in FIGS. 3 and 4, in which a platen or a mold plate is shown schematically and designated therein by the reference numeral 40.

The platen 40 in an overtravel situation strikes the gas cylinder actuator 10 in an axial direction X, forcing a mutual compression in an axial direction of the first head 12 on the tubular jacket 11 and of the tubular jacket 11 on the wider perimetric edge 25 of the second head 13.

The lightened portion 19 of the tubular jacket 11 is the part that is shaped specifically to be less resistant to compression in the axial direction X and therefore deforms, shortening in said direction X and occupying the space available around itself, in particular invading the annular cavity 35.

The deformation of the lightened portion 19 causes a translation in the direction of the axis X between the tubular jacket 11 and the second head 13 such that the internal annular protrusion 31 moves away from the extraction-preventing shoulder 30 toward the static sealing ring 27, until it pushes against the static sealing ring 27 itself, interrupting the correct placement of the latter in its annular slot 26 and therefore its correct operation in terms of static seal.

In this configuration with the sealing ring 27 compressed and the internal annular protrusion 31 not pressed against the extraction-preventing shoulder 30, the pressurized gas in the chamber 16 can find a discharge passage 20 by flowing around the damned sealing ring 27 and by entering the clearances between the tubular jacket 11 and the second head 13.

The gas cylinder actuator 10 according to the invention is far safer than gas cylinder actuators with overtravel safety systems of the known type, since the tubular jacket 11 is deformed only in the axial direction X, for the compression of the lightened portion 19 in contact with the perimetric widened edge 25 of the second head 13, and the inward bending of the lightened portion 19, and is not deformed outward in a radial direction; the gas cylinder actuator 10 according to the invention, once it has been subjected to an overtravel event, still has the same radial space occupation and none of its parts widens radially, the risk of striking or damaging any machine parts or operators who are in the vicinity being thus eliminated.

In a second embodiment of the gas cylinder actuator according to the invention, designated in FIGS. 5 e 6 by the reference numeral 110, the lightened portion 119 is constituted by an annular flap that is formed at the end of the tubular jacket 111 and is extended from it in the axial direction X; said annular flap has a cross-section in the radial direction A that is smaller than the corresponding cross-section in a radial direction B of the central body of the tubular jacket 111.

In this second embodiment, the annular flap that forms the lightened portion 119 is located at the internal surface 129 of the tubular jacket 111 itself, therefore the internal surface 121 of the lightened portion 119 is extended continuously from the internal surface 129 of the body of the cylindrical jacket 111, adjacent to the outer surface 128 of the body with cylindrical symmetry 124 of the second head 113, as shown in FIGS. 5 and 6.

The lightened portion 119 is then surrounded externally by an annular cavity 135 in which the annular flap that forms the lightened portion 119 folds when an overtravel situation occurs.

The annular flap that forms the lightened portion 119 is then moved to bend outward in a radial direction, allowing the axial movement of the tubular jacket 111, but always remaining substantially within the space occupation defined by the outer surface 150 of the tubular jacket 111.

In a manner similar to what has been described above for the first embodiment, the compressed sealing ring 127 and the internal annular protrusion 131 not pressed against the extraction-preventing shoulder 130 allow the pressurized gas in the compression chamber to find a discharge passage by flowing around the deformed sealing ring 127 and penetrating in the clearances between the tubular jacket 111 and the second head 113.

In a third embodiment of the gas cylinder actuator according to the invention, designated in FIGS. 7 and 8 by the reference numeral 210, the lightened portion 219 is constituted by a perimetric annular flap that is formed at the end of the tubular jacket 211 and extends from it in the axial direction X; said annular flap has a cross-section in the radial direction A that is smaller than the corresponding cross-section in the radial direction B of the central body of the tubular jacket 211.

In the third embodiment, the annular flap that forms the lightened portion 219 is located at the outer surface 221 of the tubular jacket 211 and therefore the outer surface 222 of the lightened portion extends continuously from the outer surface 221 of the body of the cylindrical jacket 211.

The second head 213, for closure of the tubular jacket 211 on the opposite side with respect to the first head 212, is constituted by a body with cylindrical symmetry 224, which is contoured to arrange itself in the corresponding end portion 218 of the tubular jacket 211, which has a wider perimetric edge 225, for resting in the axial direction X the lightened portion 219, i.e., the annular flap, an extraction-preventing shoulder 230, adapted for abutment against a corresponding internal annular protrusion 231 that protrudes radially from the internal surface 229 of the tubular jacket 211, the extraction-preventing shoulder 230 and the internal annular protrusion 231 being adapted to cooperate in order to prevent the extraction of the head 213 from the tubular jacket 211;

an annular slot 226 for a static sealing ring 227, the latter being preset to act between a portion of the outer surface 228 of the annular slot 226 of the head 213 and a portion of the internal surface 229 of the tubular jacket 211.

The extraction-preventing shoulder 230 is located between the internal annular protrusion 231 and the annular slot 226; in this manner, the sealing element, i.e., the static sealing ring 227, cannot be moved or compressed by the translation of the internal annular protrusion 231 moving away from the extraction-preventing shoulder 230.

In this third embodiment, inside the tubular jacket 211 there is an annular seal interruption slot 250, located proximate to the portion of internal surface 229 of the tubular jacket 211 affected by contact with the static sealing ring 227, when the gas cylinder actuator 210 is in the normal configuration for operation as in FIG. 7, said portion of internal surface 229 being located between the internal annular protrusion 231 and the seal interruption slot 250.

The position of the seal interruption slot 250 is such that if overtravel has occurred, the damnation of the lightened portion 219 and the consequent mutual translation in an axial direction between the tubular jacket 211 and the second head 213 in the direction for greater insertion of the second head 213 in the tubular jacket 211 defines a new mutual position between the sealing ring 227 and the annular seal interruption slot 250, with the sealing ring 227 at least partially facing the annular seal interruption slot 250, for example completely facing the annular seal interruption slot 250, as in FIG. 8.

In this mutual position, the sealing ring 227 is unable to determine the seal, allowing the pressurized gas in the compression chamber to find a discharge passage around the sealing ring 227 and through the clearances between the tubular jacket 211 and the second head 213.

In this third embodiment, between the lightened portion 219 and the corresponding head 213 there is an annular cavity 235 into which the annular flap that forms the lightened portion 219 folds when an overtravel situation occurs.

The annular flap that forms the lightened portion 219 is thus moved to fold toward the inside of the gas cylinder actuator 210, i.e., toward the head 213, allowing the axial displacement of the tubular jacket 211.

Figure 9:
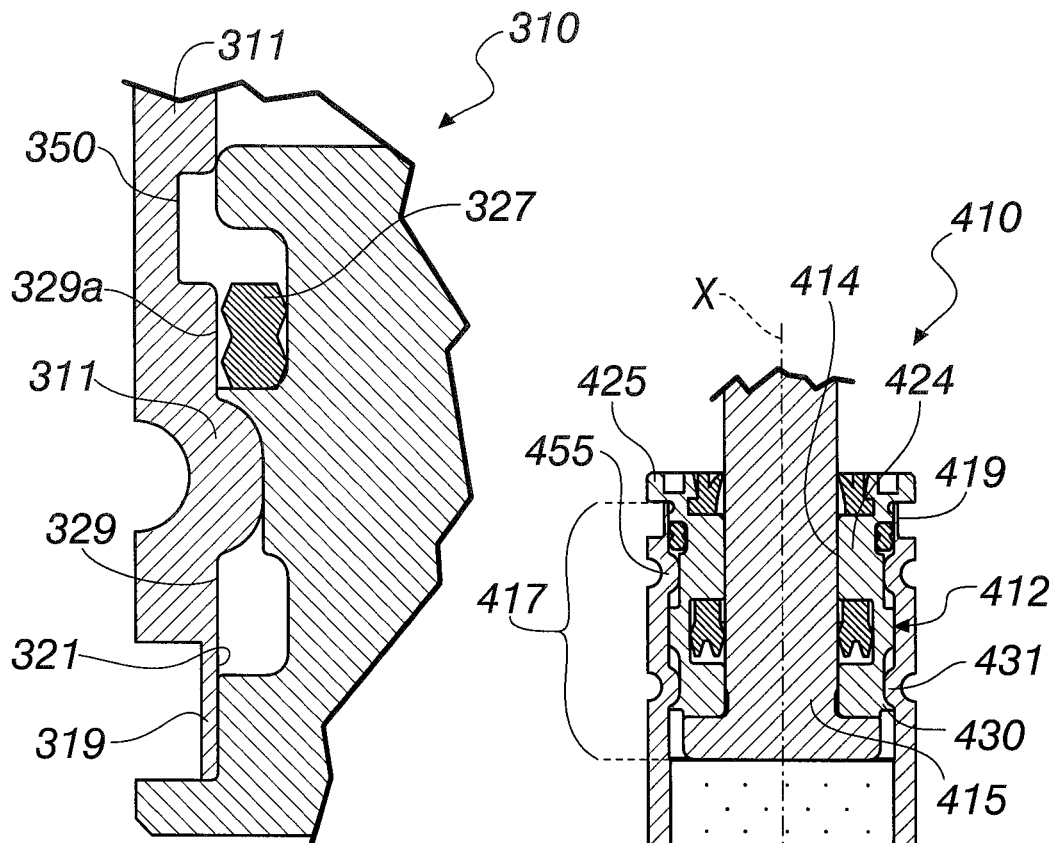
FIG. 9 is a view of a detail of the gas cylinder actuator according to the invention in a fourth embodiment, in a configuration for normal operation.

In a fourth embodiment, shown schematically in FIG. 9 and designated therein by the reference numeral 310, the gas cylinder actuator 310 comprises an annular flap that forms the lightened portion 319 located at the internal surface 329 of the tubular jacket 311, therefore with the internal surface 321 of the lightened portion 319 extending continuously from the internal surface 329 of the body of the cylindrical jacket 311, and, inside the tubular jacket 311, an annular seal interruption slot 350, located proximate to the portion of internal surface 329a of the tubular jacket 311 that is affected by contact with the static sealing ring 327, when the gas cylinder actuator 310 is in the normal configuration for operation, with said portion of internal surface 329a located between the internal annular protrusion 331 and the seal interruption slot 350, as described above for the third embodiment of the gas cylinder actuator 210 according to the invention.

Figure 10:
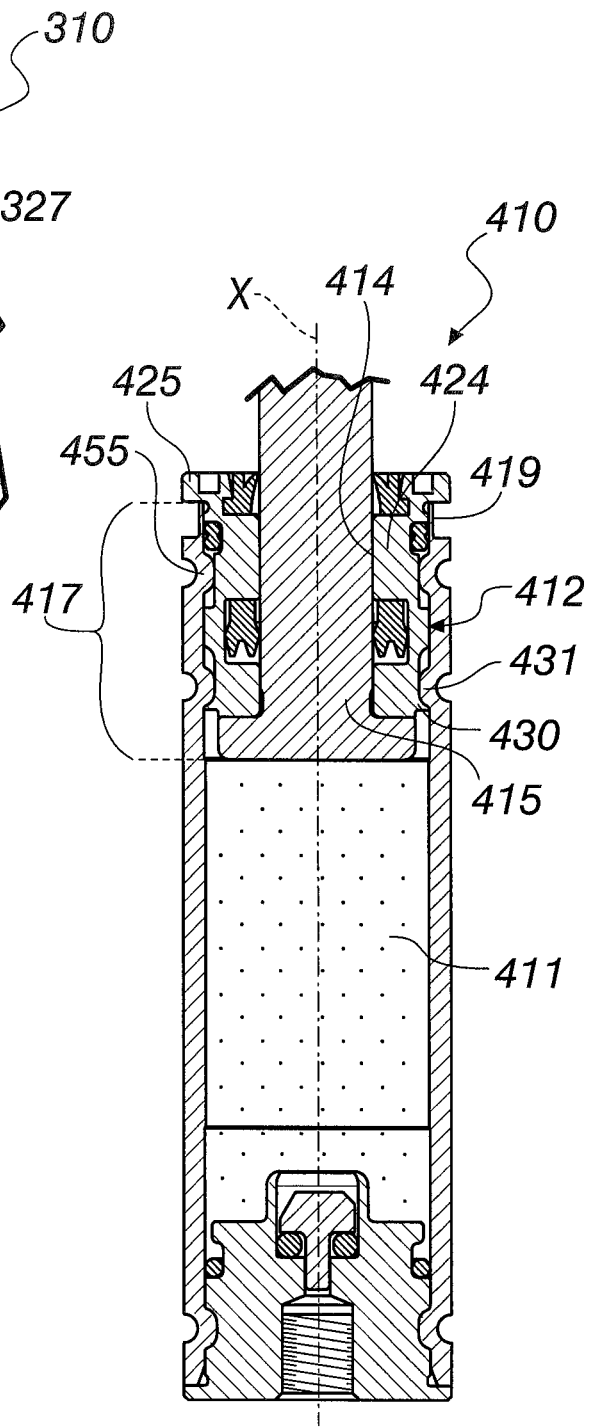
FIG. 10 is a sectional side view of the gas cylinder actuator according to the invention in a fifth embodiment thereof.
Figures 11, 12:
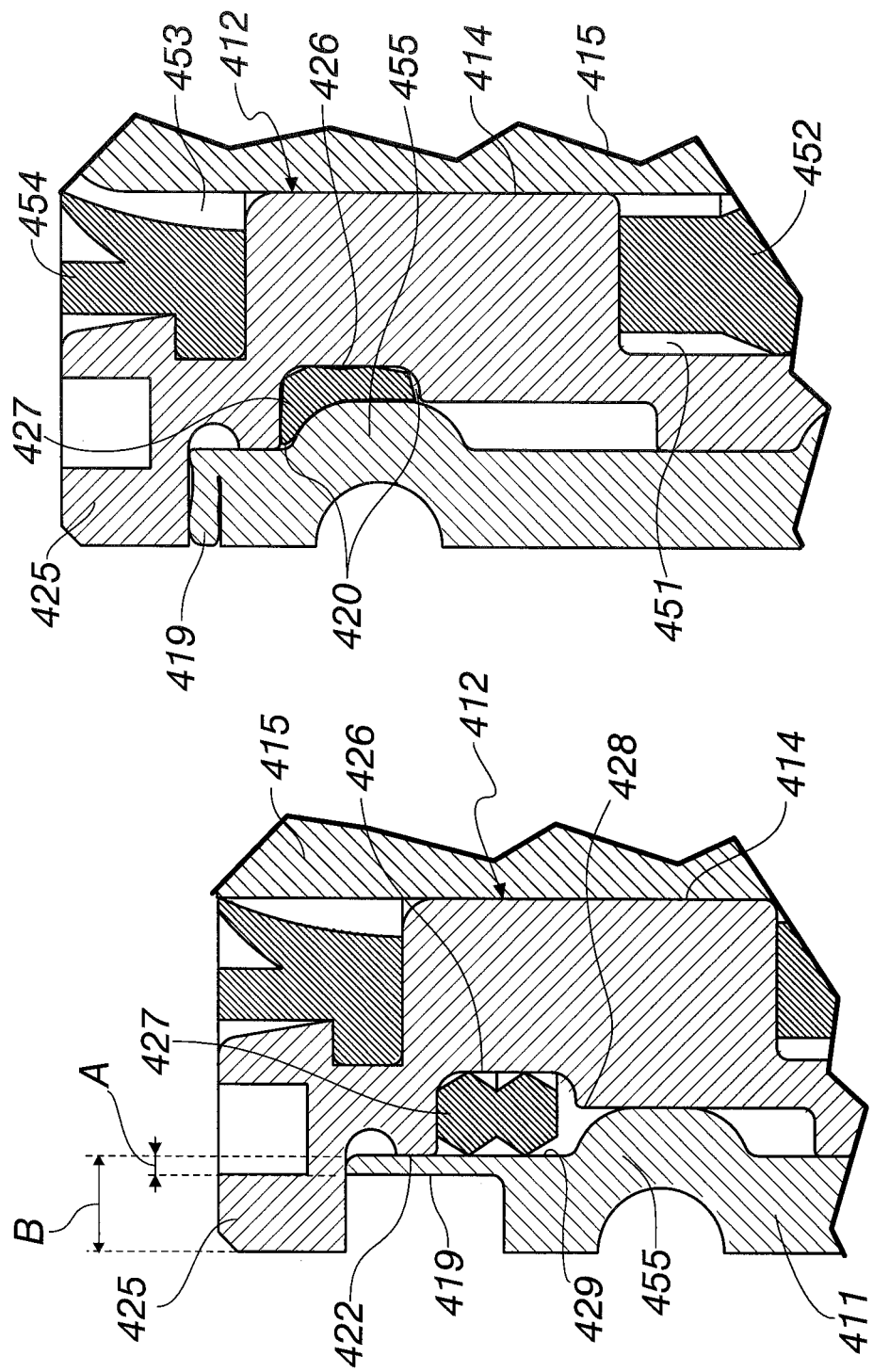
FIG. 11 is a view of a detail of FIG. 10 in a configuration for normal operation of the gas cylinder actuator.
FIG. 12 is a view of the same detail of FIG. 11 in a configuration in which overtravel has occurred.

A fifth embodiment of a gas cylinder actuator according to the invention is shown in FIGS. 10 to 12 and designated therein by the reference numeral 410.

In this fifth embodiment, the portion of tubular jacket 411 affected by a head is the portion of tubular jacket 417, affected by the first head 412.

The lightened portion 419, in case of compression in an axial direction of the tubular jacket 411, is deformed, allowing the relative movement of the first head 412 in an axial direction, i.e., in the direction of the main axis of symmetry X of the gas cylinder actuator 410, toward the inside of the tubular jacket 411, so as to form a gas discharge passage 420 between the jacket 411, the head 412 and the corresponding sealing element, described hereinafter.

The discharge passage 420 is highlighted in FIG. 12.

In this fifth embodiment of the invention, the portion of tubular jacket 411 affected by a head is the portion of tubular jacket 417 affected by the first head 412, said lightened portion 419 being formed at the end of the tubular body 411 that rests on a corresponding wider perimetric edge 425 of the first head 412.

The lightened portion 419 is constituted by an annular flap that is extended axially, i.e., in an axial direction X, formed at the end of the tubular jacket 411 and extending from it, having a cross-section in a radial direction A that is smaller than the corresponding cross-section in the radial direction B of the central body of the tubular jacket 411.

In this fifth embodiment, the annular flap that forms the lightened portion 419 is located at the internal surface 429 of the tubular jacket 411 itself, therefore the internal surface 422 of the lightened portion 419 is extended with continuity from the internal surface 429 of the body of the cylindrical jacket 411.

The first head 412 is constituted by a body with cylindrical symmetry 424, shaped so as to arrange itself in the corresponding end portion 417 of the tubular jacket 411, which has a wider perimetric edge 425, for resting in the axial direction X for the lightened portion 419, i.e., the annular flap, an annular slot 426 for a sealing element, for example a static sealing ring 427, the latter being preset to act between the outer surface 428 of the head 412 and the internal surface 429 of the tubular jacket 411;

an extraction-preventing shoulder 430 adapted for abutment against a corresponding internal annular protrusion 431 that protrudes radially from the internal surface 429 of the tubular jacket 411, the extraction-preventing shoulder 430 and the internal annular protrusion 431 being adapted to cooperate in order to prevent the extraction of the head 412 from the tubular jacket 211;

a through passage hole 414 for the passage of a stem-piston 415;

an internal annular seat 451 for a dynamic sealing ring 452 between the first head 412 and the stem-piston 415;

an annular end slot 453 for an oil scraper ring 454.

The tubular body 411 has an internal annular protrusion 455 for interrupting the seal of the static sealing ring 427.

The internal annular protrusion for seal interruption 455 is located, in the normal operating configuration of the gas cylinder actuator 410, proximate to the annular sealing element, i.e., the static sealing ring 427.

When an overtravel event occurs, the lightened portion 419 is deformed, i.e., bent outward, the first head 412 translates axially toward the inside of the tubular body 411 and the static sealing ring 427 is entrained against the internal annular protrusion 455, which crushes it and deforms it, as exemplified in FIG. 12.

In a manner similar to what has been described above for the first and second embodiments, the sealing ring 427, which is compressed, and the inner annular protrusion 431, which is not pressed against the extraction-preventing shoulder 430, allow the pressurized gas in the compression chamber to find a discharge passage, flowing around the deformed sealing ring 427 and penetrating the clearances between the tubular jacket 411 and the first head 412.

In practice it has been found that the invention achieves the intended aim and objects.

In particular, the invention provides a gas cylinder actuator that is safer than gas cylinder actuators with overtravel safety device of the known type, by virtue of the possibility to be deformed, by overload in an axial direction as in the case of an overtravel event, in an axial direction and not in a radial one as for gas cylinder actuators of the known type.

Another object of the invention is to provide a gas cylinder actuator in which occurrence of the operation of the overtravel safety device is clearly perceivable, since the lightened portions at one end of the tubular jacket are clearly visible and any deformation thereof is clearly visible.

The invention provides a gas cylinder actuator with a functionality that is not lower than that of gas cylinder actuators of the known type.

The invention thus conceived is susceptible of numerous modifications and variations, all of which are within the scope of the appended claims; all the details may further be replaced with other technically equivalent elements.

In practice, the components and the materials used, so long as they are compatible with the specific use, as well as the contingent shapes and dimensions, may be any according to requirements and to the state of the art.

The disclosures in Italian Patent Application No. 102015000085553 (UB2015A009608) from which this application claims priority are incorporated herein by reference.

What is claimed is:

1. A gas cylinder actuator with overtravel safety device, comprising:
a tubular containment jacket,
two opposite heads for closing said tubular jacket, with corresponding sealing elements between the heads and the jacket, a first head provided with a through passage hole for a stem-piston, and a second opposite head,
a stem-piston,
between said tubular jacket, said opposite heads and said stem-piston there being a chamber for pressurized gas, wherein said tubular jacket has, at at least one of the portions affected by one of said opposite heads, a lightened portion that is preset to be deformed in case of compression in an axial direction, allowing the relative movement of a corresponding head of said opposite heads toward the inside of said tubular jacket so as to form a gas discharge passage between the jacket, the corresponding head and the corresponding sealing element, wherein the portion of tubular jacket affected by a head is constituted by the portion of the tubular jacket that is affected by the second head, said lightened portion being formed at the end of said tubular body that rests on a corresponding wider perimetric edge of said second head.

2. The gas cylinder actuator according to claim 1, wherein said lightened portion is constituted by a perimetric annular flap that is formed at the end of the tubular jacket and extends from it in an axial direction, having a cross-section in a radial direction that is smaller than a corresponding cross-section in a radial direction of the central body of the tubular jacket.

3. The gas cylinder actuator according to claim 2, wherein said annular flap that forms the lightened portion is located at an outer surface of said tubular jacket, an outer surface of the lightened portion extending with continuity from the outer surface of the body of the cylindrical jacket.

4. A gas cylinder actuator with overtravel safety device, comprising:
a tubular containment jacket,
two opposite heads for closing said tubular jacket, with corresponding sealing elements between the heads and the jacket, a first head provided with a through passage hole for a stem-piston, and a second opposite head, a stem-piston, between said tubular jacket, said opposite heads and said stem-piston there being a chamber for pressurized gas, wherein said tubular jacket has, at at least one of the portions affected by one of said opposite heads, a lightened portion that is preset to be deformed in case of compression in an axial direction, allowing the relative movement of a corresponding head of said opposite heads toward the inside of said tubular jacket so as to form a gas discharge passage between the jacket, the corresponding head and the corresponding sealing element, wherein said second head, for closing the tubular jacket on the opposite side with respect to the first head, is constituted by a body with cylindrical symmetry, which is contoured to arrange itself in a corresponding portion of the tubular jacket, and has a wider perimetric edge, for resting in an axial direction for the lightened portion, an annular slot for a sealing element, which is preset to act between an outer surface of the head and an internal surface of the tubular jacket;

an extraction-preventing shoulder, adapted for abutment against a corresponding internal annular protrusion that protrudes radially from the internal surface of the tubular jacket, said extraction-preventing shoulder and said internal annular protrusion being suitable to cooperate in order to prevent the extraction of the head from the tubular jacket;

a gas loading hole;

a seat for a check valve.

5. The gas cylinder actuator according to claim 4, wherein said internal annular protrusion is contoured and sized so that it is preset for the compression or displacement of said sealing element in an overtravel situation.

6. A gas cylinder actuator with overtravel safety device, comprising:

a tubular containment jacket, two opposite heads for closing said tubular jacket, with corresponding sealing elements between the heads and the jacket, a first head provided with a through passage hole for a stem-piston, and a second opposite head, a stem-piston, between said tubular jacket, said opposite heads and said stem-piston there being a chamber for pressurized gas, wherein said tubular jacket has, at at least one of the portions affected by one of said opposite heads, a lightened portion that is preset to be deformed in case of compression in an axial direction, allowing the relative movement of a corresponding head of said opposite heads toward the inside of said tubular jacket so as to form a gas discharge passage between the jacket, the corresponding head and the corresponding sealing element, wherein said lightened portion is constituted by a perimetric annular flap that is formed at the end of the tubular jacket and extends from it in an axial direction, having a cross-section in a radial direction that is smaller than a corresponding cross-section in a radial direction of the central body of the tubular jacket, and wherein an annular cavity is formed between the lightened portion and the corresponding head and the annular flap that forms the lightened portion folds therein when an overtravel situation occurs.

7. A gas cylinder actuator with overtravel safety device, comprising:

a tubular containment jacket, two opposite heads for closing said tubular jacket, with corresponding sealing elements between the heads and the jacket, a first head provided with a through passage hole for a stem-piston, and a second opposite head, a stem-piston, between said tubular jacket, said opposite heads and said stem-piston there being a chamber for pressurized gas, wherein said tubular jacket has, at at least one of the portions affected by one of said opposite heads, a lightened portion that is preset to be deformed in case of compression in an axial direction, allowing the relative movement of a corresponding head of said opposite heads toward the inside of said tubular jacket so as to form a gas discharge passage between the jacket, the corresponding head and the corresponding sealing element, wherein said lightened portion is constituted by an annular flap that is extended in an axial direction, is formed at an end of the tubular jacket and is extended from it, with a cross-section in a radial direction that is smaller than a corresponding cross-section in a radial direction of the central body of the tubular jacket, said annular flap being provided at an internal surface of said tubular jacket, an internal surface of the lightened portion being extended with continuity from the internal surface of the body of the cylindrical jacket, and wherein said lightened portion is surrounded externally by an annular cavity in which the annular flap that forms the lightened portion folds when an overtravel situation occurs.

8. A gas cylinder actuator with overtravel safety device, comprising:

a tubular containment jacket, two opposite heads for closing said tubular jacket, with corresponding sealing elements between the heads and the jacket, a first head provided with a through passage hole for a stem-piston, and a second opposite head, a stem-piston, between said tubular jacket, said opposite heads and said stem-piston there being a chamber for pressurized gas, wherein said tubular jacket has, at at least one of the portions affected by one of said opposite heads, a lightened portion that is preset to be deformed in case of compression in an axial direction, allowing the relative movement of a corresponding head of said opposite heads toward the inside of said tubular jacket so as to form a gas discharge passage between the jacket, the corresponding head and the corresponding sealing element, wherein a second head of said two opposite heads, for closing the tubular jacket on the opposite side with respect to a first head of said two opposite heads, is constituted by a body with cylindrical symmetry, which is contoured to arrange itself in the corresponding portion of the tubular jacket and is provided with a wider perimetric edge, for resting in an axial direction for the lightened portion, an extraction-preventing shoulder, adapted to abut against a corresponding internal annular protrusion that protrudes radially from an internal surface of the tubular jacket, said extraction-preventing shoulder and said internal annular protrusion being adapted to cooperate in order to prevent the extraction of the head from the tubular jacket;

an annular slot for a static sealing ring, which is preset to operate between a portion of the outer surface of the annular slot of the head and a portion of an internal surface of the tubular jacket, said extraction-preventing shoulder being arranged between the internal annular protrusion and the annular slot.

9. The gas cylinder actuator according to claim 8, wherein an annular seal interruption slot is formed inside the tubular jacket and is located proximate to the portion of the internal surface of the tubular jacket that is affected by contact with the static sealing ring, when the gas cylinder actuator is in the normal operating configuration, said portion of internal surface being located between the internal annular protrusion and the seal interruption slot.

10. A gas cylinder actuator with overtravel safety device, comprising:

a tubular containment jacket, two opposite heads for closing said tubular jacket, with corresponding sealing elements between the heads and the jacket, a first head provided with a through passage hole for a stem-piston, and a second opposite head, a stem-piston, between said tubular jacket, said opposite heads and said stem-piston there being a chamber for pressurized gas, wherein said tubular jacket has, at at least one of the portions affected by one of said opposite heads, a lightened portion that is preset to be deformed in case of compression in an axial direction, allowing the relative movement of a corresponding head of said opposite heads toward the inside of said tubular jacket so as to form a gas discharge passage between the jacket, the corresponding head and the corresponding sealing element, further comprising:

an annular flap that is extended in an axial direction and forms the lightened portion, which is located at the internal surface of the tubular jacket, and, inside the tubular jacket, an annular seal interruption slot, which is arranged proximate to a portion of an internal surface of the tubular jacket that is affected by contact with the static sealing ring, when the gas cylinder actuator is in the normal operating configuration, with said portion of internal surface that lies between the annular internal protrusion and the seal interruption slot.

11. A gas cylinder actuator with overtravel safety device, comprising:

a tubular containment jacket, two opposite heads for closing said tubular jacket, with corresponding sealing elements between the heads and the jacket, a first head provided with a through passage hole for a stem-piston, and a second opposite head, a stem-piston, between said tubular jacket, said opposite heads and said stem-piston there being a chamber for pressurized gas, wherein said tubular jacket has, at at least one of the portions affected by one of said opposite heads, a lightened portion that is preset to be deformed in case of compression in an axial direction, allowing the relative movement of a corresponding head of said opposite heads toward the inside of said tubular jacket so as to form a gas discharge passage between the jacket, the corresponding head and the corresponding sealing element, wherein the portion of tubular jacket affected by a head is the portion of tubular jacket that is affected by the first head, said lightened portion being formed at the end of said tubular body that rests against a corresponding wider perimetric edge of the first head.

* * * * *